Figure 1:
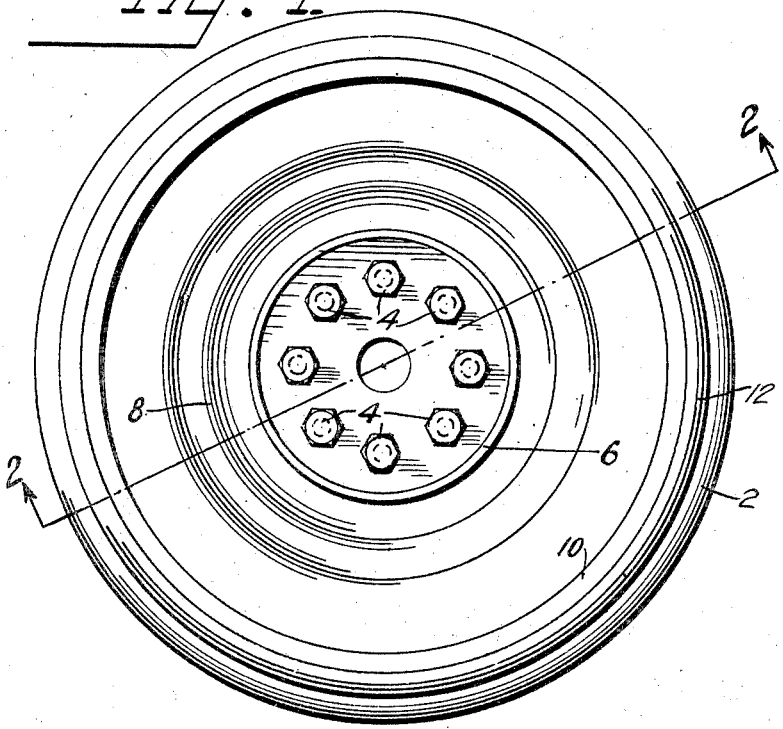

March 11, 1941.　　　　A. BRISKMAN　　　　2,234,838
EMERGENCY SAFETY WHEEL
Filed Feb. 9, 1939

Inventor
ALEX BRISKMAN.
By Howard J. Whelan.
Attorney

Patented Mar. 11, 1941

2,234,838

UNITED STATES PATENT OFFICE 2,234,838

EMERGENCY SAFETY WHEEL

Alex Briskman, Baltimore, Md., assignor of fifty per cent to Albert H. Briskman, Baltimore, Md.

Application February 9, 1939, Serial No. 255,445

1 Claim. (Cl. 301—38)

This invention refers to automobiles and more particularly to the wheels thereof, and auxiliary devices to counteract the effects of punctures in the tires used on same. It has among its objects to provide for the following features:

To provide a false wheel that will sustain the wheel in an emergency, arising from the pneumatic tire on the same becoming flat;

To have such wheel capable of functioning for a reasonable period or distance and thereby save the tire from destruction and the steering mechanism from dangerous maneuvering;

To have such a wheel easily attachable to the parts of the automobile wheel assembly and arranged not to interfere with the replacing or removal of the pneumatic tire on the main wheel, which this false wheel is mounted adjacent to.

Other features are to have the design of the wheel suitable for the work and functions attributed to it, and the capacity to adapt itself to the emergency requirements arising.

Other objects will become apparent as the invention is more fully set forth.

The provision of an emergency wheel for preventing the spoilage of pneumatic tires and tubes that go flat while the automobile is running on the highway, is a matter of considerable importance as it also prevents the danger of steering mechanism disruption and the subsequent greater damage to the automobile and its passengers. This invention anticipates these conditions by providing an emergency wheel with solid tire thereon that will become effective when the tire is deflated an excessive amount. The emergency wheel being without the usual pneumatic resiliency indicates immediately the condition of the pneumatic tire to the driver, so that he can stop the automobile and investigate. It is formed so as to take up the stresses occasioned by the automobile weight and speed incurred in the emergency. It is mounted on the brake drum and connected with same in a substantial manner and being located on the inside surface of the wheel, does not interfere with the normal removal of the tire wheel and the pneumatic tire on the same. The new emergency wheel does not require any material change in the number of bolts used in connection with the attachment of the tire wheel and cooperates with those installed to bring about the necessary connections. The relative cost of the emergency wheel is small and is more economical to use than to pay for damages incurred arising from the conditions that the emergency wheel ameliorates.

The emergency safety wheels are particularly necessary on the front or steering wheels, since the blow-out of the pneumatic tires on these wheels will tend to cause an erratic movement of the vehicle that may follow with a serious accident. The tires on the emergency wheels are secured through the use of a dovetailed arrangement of tire and peripheral groove of the wheel, this arrangement forming positive locking for the tire on the wheel, against the twisting stresses arising during the first moments of the emergencies, tending to remove or dismantle the emergency tire.

Figure 2:
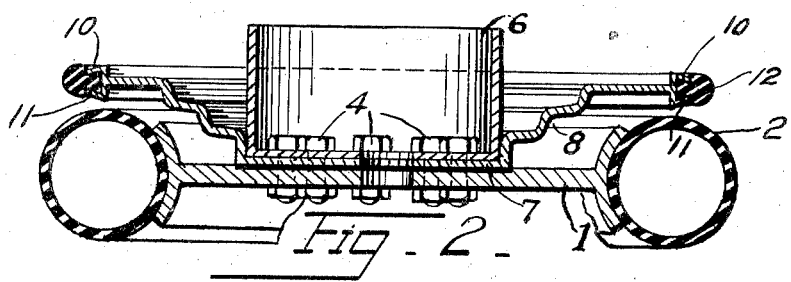
Figure 3:
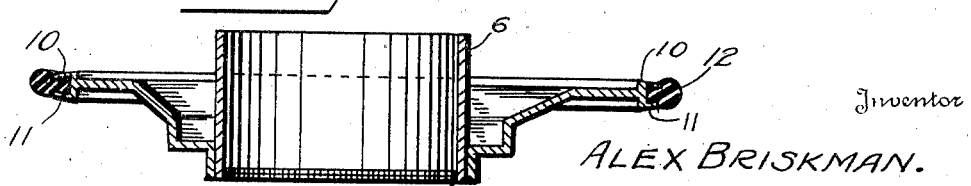

In the drawing, which illustrates an embodiment of this invention:

Figure 1 is a side elevational view of an automobile wheel, with an emergency wheel embodying this invention, attached to it, Figure 2 is a sectional view of the emergency wheel taken along the line 2—2 of Figure 1, Figure 3 is a modified form of emergency wheel in section.

Similar reference characters refer to similar parts throughout the drawing.

In the construction indicated 1 represents the conventional construction of an automobile wheel adapted for a pneumatic tire 2. The central portion of the wheel 3 is arranged with holes for holding bolts 4 and axle assembly, or brake drum parts 6. These holding bolts are arranged to project through a back or central plate 7 of an emergency wheel structure 8 which is formed with dished out offset formation adapted to bring a peripheral groove portion 10 close to the side of the tire 2. This groove portion has converging walls that serve to contain and hold the base portion 11 of a solid rubber or resilient tire 12. The tire 12 has a circumferential outline based on a diameter less than that of the exterior peripheral line of the tire 2, when inflated. The deflation of the tire 2 and its physical distortion due to running on the ground while so deflated, bring its casing and tube parts to a position where the rigid emergency wheel will sustain the weight of the auto-vehicle normally sustained by the tire 2 and its wheel structure. This action saves the tire 2 from the grounding and grinding and incident damage to the casing and tube thereof, and possibly their destruction. The emergency wheel takes up the stresses and weight incident to its being called into play and enables the automobile to be brought to a slow stop without erratic reactions on the steering mechanism and guiding.

The cylindrical part of the brake drum shown in Figure 2 is a part of the wheel 8, and also of the central plate 7, this is preferably provided for by expanding the wheel through the use of heat and then tightening on the rim of the drum inserted in place after cooling same. This makes the parts practically integral and solidly joined, so as to be one piece or unit.

The attachment of the emergency wheel to the main wheel is brought about by the attachment of the back plate 7 to the hub portion of the pneumatic wheel structure, by the bolts which are made slightly longer than usual to provide for the greater thickness which the additional member aids. The emergency wheel is located on the inside face of the wheel 1, and adjacent the brake drum 6, on which it rests.

The modified form of emergency wheel indicated in Figure 3 is similar to the previous structure in general, but is attached somewhat differently, in that the back plate is dispensed with, and integral or welded connection is made to the brake drum exterior surface as shown at 5. The bolts are not disturbed in their arrangement in any way. This form keeps the emergency wheel entirely separate from the pneumatic tire wheel, which has certain advantages under conditions requiring no interference in the removal and replacement of the latter. The wedge form 12, of the rim groove is essential to the device since solid tires unlocked in this connection do not stay on, when the emergency wheel is called into operation.

The wedge-form or dovetailed construction of the emergency tire 12 is so formed that the portion insertable in the groove portion 10 is about one-half the total depth of the tire. This is to prevent the leverage on the peripheral or tread portion of the tire due to the pressure arising from the action of skidding or twisting stresses on the road, from forcing the tire from the groove.

Having thus described the invention, what is claimed is:

In a safety wheel of the class described, in combination, a brake drum, a safety wheel having a central circular plate connecting with concentric axially stepped portions converging towards the axis thereof, an inner portion surrounding and peripherally resting on the edge portion of the drum adapted to coact therewith, the periphery of the plate having an integral flange thereon provided with a dove-tailed annular groove, a tire having a rounded road-contacting surface so held by the said annular groove portion as to be locked against explosions arising from blow-outs in the main tire located adjacent thereto and from being pressed out from the rim during the travel of the safety wheel on the roadway under the sudden reactions caused by the blow-outs, substantially as described.

ALEX BRISKMAN.